United States Patent [19]

Koda et al.

[11] 4,347,566

[45] Aug. 31, 1982

[54] DATA PROCESSOR WITH REGISTER FILE AND ARITHMETIC LOGIC CIRCUIT ON ONE CHIP AND REGISTER MEANS DIRECTLY CONNECTED TO THE CHIP

[75] Inventors: Akira Koda; Fumitaka Sato, both of Ome; Shinji Nishibe, Hachioji, all of Japan

[73] Assignee: Tokyo Shibaura Denki Kabushiki Kaisha, Kawasaki, Japan

[21] Appl. No.: 100,447

[22] Filed: Dec. 5, 1979

[30] Foreign Application Priority Data

Dec. 11, 1978 [JP] Japan .................... 53-151928
Dec. 11, 1978 [JP] Japan .................... 53-151929

[51] Int. Cl.³ .................................................. G06F 9/34
[52] U.S. Cl. ............................................... 364/200
[58] Field of Search ... 364/200 MS File, 900 MS File

[56] References Cited

U.S. PATENT DOCUMENTS

| | | | |
|---|---|---|---|
| 3,646,522 | 2/1972 | Furman et al. | 364/200 |
| 4,086,658 | 4/1978 | Finlay | 364/900 |
| 4,087,854 | 5/1978 | Kinoshita et al. | 364/200 |
| 4,130,869 | 12/1978 | Kinoshita et al. | 364/200 |

OTHER PUBLICATIONS

*The Am2900 Family Data Book,* Advanced Micro Devices Inc., Sunnyvale, Calif., 1976, pp. 1-21.

*Primary Examiner*—Harvey E. Springborn
*Attorney, Agent, or Firm*—Kenyon & Kenyon

[57] ABSTRACT

A microprogram-controlled data processor executes a user instruction having an operation code field to specify the type of user instruction and at least one operand field to designate one of the general registers provided in a register file. The data processor comprises a logic circuit including the register file and at least one register connected directly to the register file for storing address data for addressing the register file. The data in the operand field of the user instruction is stored in the register during a microstep immediately before the first microstep of the microprogram for executing the user instruction. The output signal of the register designates one of the general registers provided in the register file.

11 Claims, 13 Drawing Figures

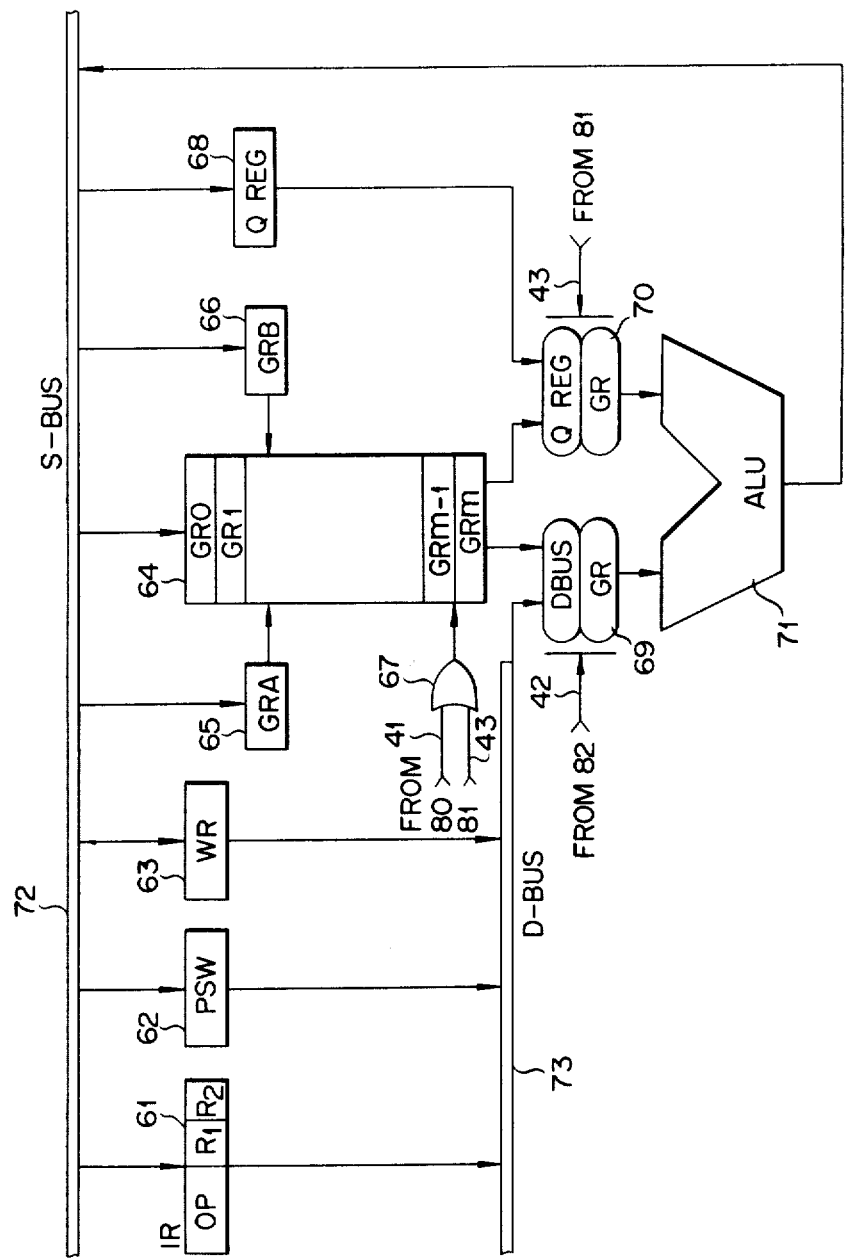
F I G. 6

F I G. 7
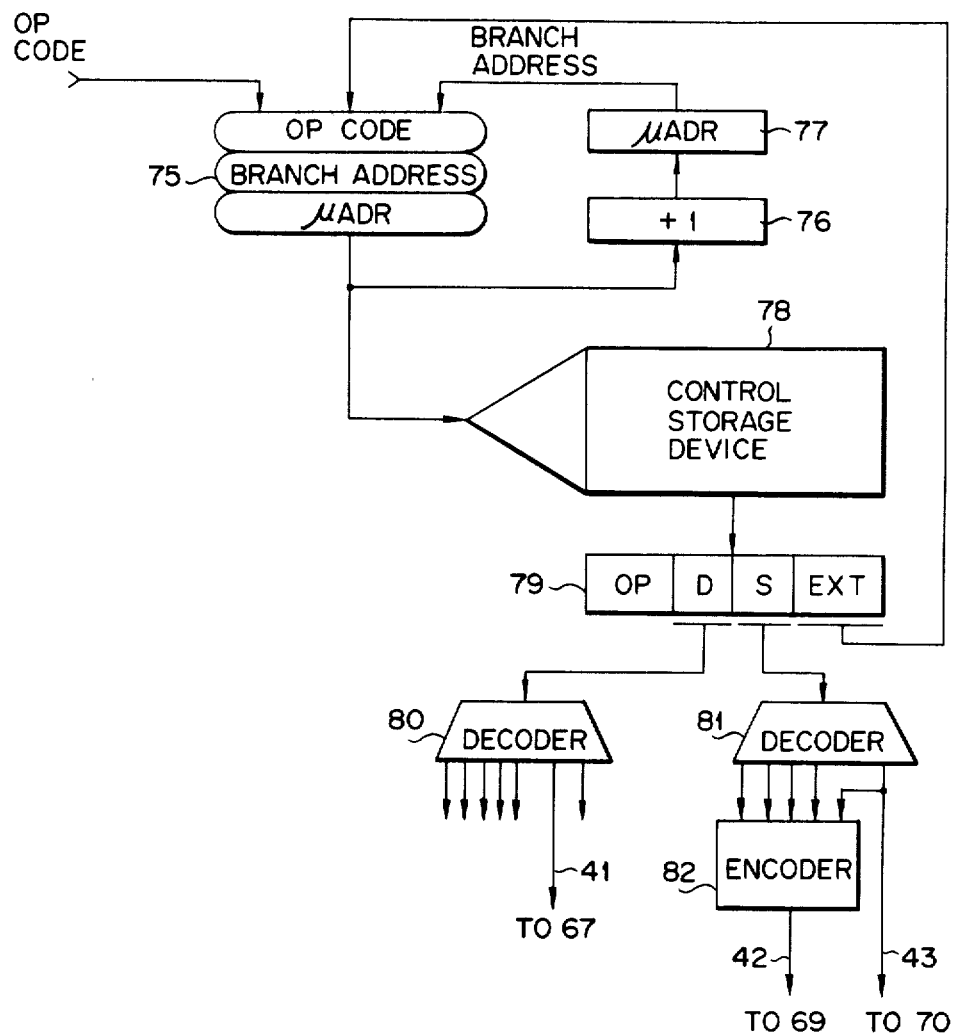

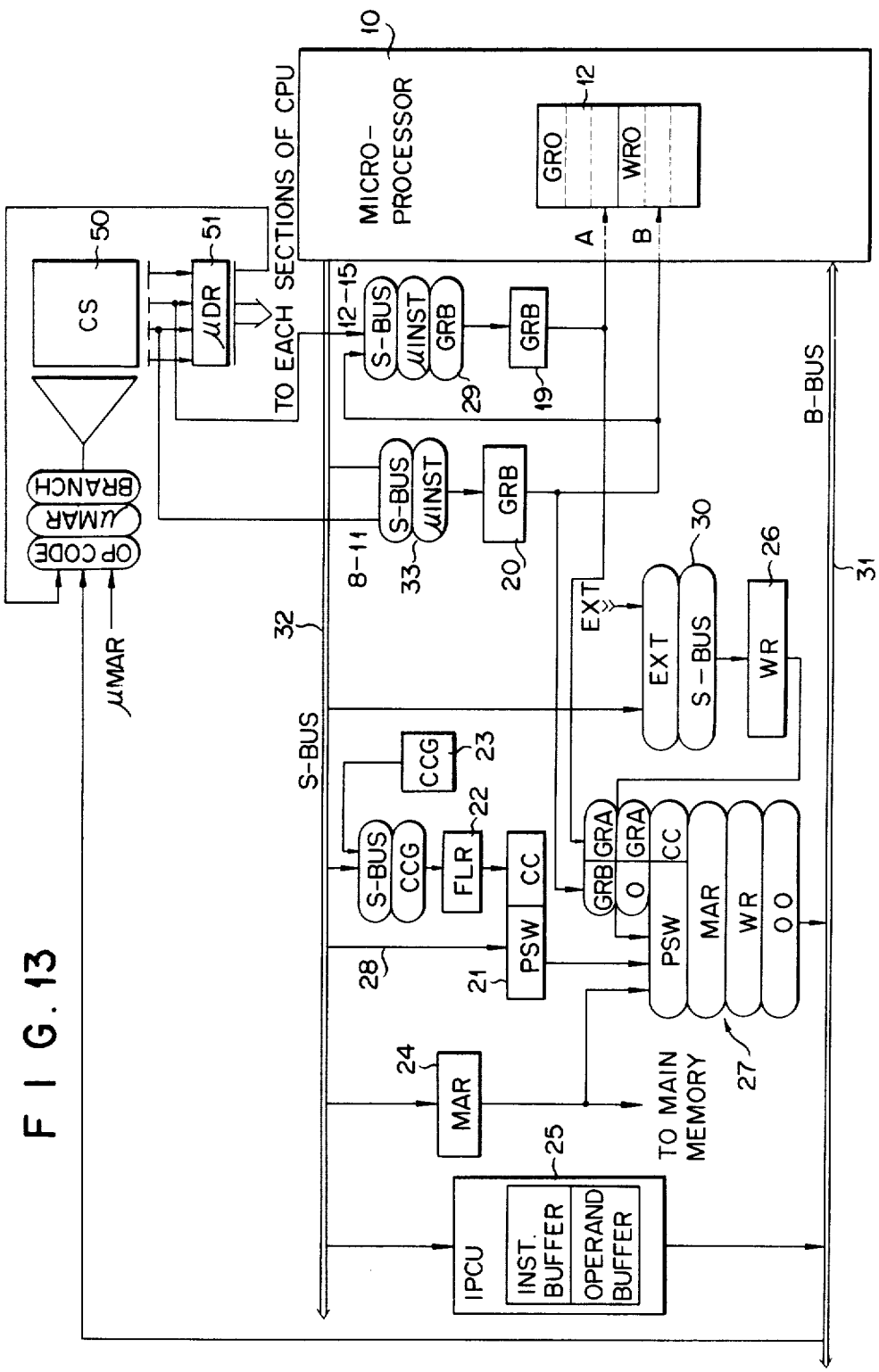
F I G. 13

DATA PROCESSOR WITH REGISTER FILE AND ARITHMETIC LOGIC CIRCUIT ON ONE CHIP AND REGISTER MEANS DIRECTLY CONNECTED TO THE CHIP

BACKGROUND OF THE INVENTION

The invention relates to an improvement in a data processor using a semiconductor logic circuit or element which has a register file and an arithmetic logic circuit both provided on one chip.

Recently, rapid development of LSI (Large Scale Integration) technology has succeeded in reducing the cost of data processors using such LSIs. Because inexpensive LSIs are available readily, it has been proposed to assemble such LSIs into a data processor assigning various functions to the LSIs and operate them systematically in the data processor thus assembled. One of the proposals employs LSIs as semiconductor logic circuit elements (hereinafter referred to as microprocessors) for central processing units (CPUs) of the data processor which are operated in accordance with software or firmware instructions. One such microprocessor is commercially available as an AM 2901A 4-bit slice microprocessor manufactured by Advanced Micro Devices Inc.

FIG. 1 is a block diagram of a conventional arithmetic control unit 10 using the microprocessors. The arithmetic control unit 10, constituted by four 4-bit slice microprocessors includes a register file 12 a Q register 13, a selector 14, an arithmetic logic unit 15, a multiplexer 16 and a shifter 17, and is capable of effecting 16-bit processing. The register file 12 is a 2-part random access memory (RAM) and the Q register 13 is used as a working register. The selector 14 additionally included in the unit 10 is provided with five input terminals for receiving data A and B from the register file 12, data Q outputted from the Q register 13, data D on a data input bus, and data U outputted from another working register (not shown). The selector 14, when receiving such input data, supplies two outputs to the arithmetic logic unit 15 (ALU). The ALU 15 performs arithmetic operations on the data from the selector 14 and supplies the result of the operations to the multiplexer 16. The multiplexer 16 selects data either from the register file 12 or the ALU 15. The data selected by the multiplexer 16 is outputed on an output data bus Y. The shifter 17, which is connected between the ALU 15 and the register file 12, shifts and rotates 32-bit data when both the register file 12 and the Q register 13 are used and shifts and rotates 16-bit data when only the register file 12 is used. The construction of the microprocessor as mentioned above is disclosed in "The AM2900 Family Data Book", 1976, published by Advanced Micro Devices Inc., Sunnyvale, Calif., and accordingly, is not described further here.

When all the registers in the register file 12 are used as general registers, they are accessed using the operand field $R_1$ and $X_1$ of an external instruction register 1. When some of the registers of file 12 are used as general registers and the remaining ones as working registers, access to the register file 12 is made by using the operand field $R_1$ or $X_1$ of the instruction register 1 and the register designation field source $S_1$ or destination $D_1$ of a microinstruction register ($\mu$DR)2 which stores microinstructions. In this case, either the operand field $R_1$ or $X_1$ of the instruction register 1 and either designation field $S_1$ or $D_1$ of the microinstruction register 2 are selected by selectors 3 and 4 to access the register file 12. Specifically, the output of the operand field $R_1$ and $X_1$ of the instruction register 1 specifies an address of the register file 12 used as a general register and the output of the register designation field $S_1$ or $D_1$ of the microinstruction register ($\mu$DR)2 specifies an address of the register file 12 used as a working register. In other words, in the construction of the conventional device described above, combination circuits such as selectors 3 and 4 are connected between the register files 12 disposed within the control unit 10, and the instruction register 1 and the microinstruction register 2 both disposed exteriorly of the control unit 10. Because of such a construction, the time to access the selectors 3 and 4 lengthens each microstep and thereby an instruction execution cycle. The solution of this problem would speed up data processing. The longest processing time in a data processor of the microprogram controlled type is taken for the execurtion of a microinstruction which inbstructs the ALU 15 to perform an arithmetic operation on the contents of a register of the register file 12 specified by the register designation fields ($S_1$ and $D_1$) and load the result of the operation into the register of the register file 12 designated by the register designation field $D_1$. In such a data processor, the time for processing the longest microinstruction must be regarded as one machine cycle. As a consequence, if the time for processing the microinstruction is shortened, data processing speed could be considerably improved.

SUMMARY OF THE INVENTION

Accordingly, an object of the invention is to provide a data processor in which the register file of a central processing unit comprised of microprocessors is driven directly by the output of an address register, thus shortening instruction execution time.

Another object of the invention is to provide a data processor in which a part of a user instruction word is set in an address register in a step preceding the first microstep of a microprogram for executing the user instruction so that the register file may be accessed in the first microstep.

Still another object of the invention is to provide a data processor in which, when the number of registers in the file register is larger than that specified by a user instruction word, the remaining registers may be addressed freely, thereby rendering microprogramming easier.

A microprogram-controlled data processor according to this invention comprises a semiconductor logic circuit including a register file, an arithmetic logic circuit and a selector provided between the register file and the arithmetic logic circuit, all formed on the same chip. A register which receives one or more addresses of the register file is connected directly to the semiconductor logic circuit.

Provisions are made for writing into the register one or more addresses of the register file from the user instruction. Control circuitry is also provided for reading at least one operand from the register file using the address in the register, and for transferring the operand to the arithmetic logic circuit through the selector while the user instruction is being executed.

The register file is, for example, the register file of a microprocessor and contains general registers (GR) of a CPU. It is directly driven by outputs of address registers (GRA and GRB), thereby reducing the instruction exeuction cycle. A user instruction is prefetched, and that part of the user instruction which is used to designate the general registers (GR) is written into the address registers (GRA and GRB) immediately before the first microstep of a microprogram for executing the user instruction. Thus, arithmetic operation can be started upon the start of the user instruction. This helps to shorten one-machine cycle of the CPU. Further, since the microprogram need not be used to write the part of the user instruction into the address registers (GRA and GRB), a microstep for accomplishing that is not needed. As soon as the address registers (GRA and GRB) receive address information from the user instruction, the general registers (GR) are accessed whereby data is read from them and subsequently processed. The data processor can therefore process data at a high speed.

Other objects and features of the invention will be apparent from the following description taken in connection with the accompanying drawings.

BRIEF DESCRIPTION OF THE DRAWINGS

FIG. 6 is a block diagram of an embodiment of a data processor which can effect operations on the data read from one general register and the data read from another general register during one microstep;

FIG. 7 is a block diagram of the microprogram control section of the data processor shown in FIG. 6;

FIG. 13 is a block diagram of still another embodiment of a data processor according to the invention.

DETAILED DESCRIPTION OF THE PREFERRED EMBODIMENTS FORMATS OF USER INSTRUCTION WORDS (FIGS. 2A TO 2D)

Before preceding with a description of an embodiment of a data processor of the invention, the formats of user instruction words used in the data processor will be described with reference to FIGS. 2A to 2D. FIG. 2A shows a format of an RR type user instruction which is a 2-byte instruction to instruct loading of data between 2 general registers in a register file of a microprocessor for an arithmetic operation, the operation of the arithmetic operation or the comparison of the result of the arithmetic operation. FIG. 2B shows a format of an SF type user instruction which is a 2-byte instruction to instruct the loading of data between a register and a numeral for an arithmetic operation, the operation of the arithmetic operation or the comparison of the result of the arithmetic operation. FIG. 2C shows a format of an RX type user instruction which is a 4-byte instruction to instruct loading of data between a register and a main memory for an arithmetic operation and the operation of the arithmetic operation. FIG. 2D shows a format of an RI type user instruction which is a 4-byte instruction to instruct data loading between a register and an address (constant) for an arithmetic operation and the operation of the arithmetic operation.

All instruction words include an operation (OP) field, a first operand field and a second operand field. The contents of the first and second operand fields are different for each instruction word. Generally, the first operand field designates a general register number (GR) and a mask value or a numerical value and the second operand field designates a general register number (GR) or an index register number and an address or a numerical value. The operation field is specified by two digits of a hexadecimal code (i.e. 8 bits) which designate the type of instructions. In the instruction words of FIGS. 2A-2D, an $R_1$ field designates a general register for storing the result of the operation of an instruction. If the contents of the $R_1$ field are previously loaded into a register GRB which will be described later, a microprogram may be prepared easily. An $R_2$ field (FIG. 2A) designates a second operand. An $X_2$ field (FIG. 2C) designates an index register. If the contents of the $R_2$ and $X_2$ fields are previously loaded into a register GRA which will be described later, a microprogram may be prepared easily. Further, in the case of the SF type user instruction, if the contents of the N field (designating a second operand) are transferred to a microprocessor which will be described later, the preparation of a microprogram may be made easily.

DATA PROCESSOR CONSTRUCTION (FIG. 3)

Figure 1:
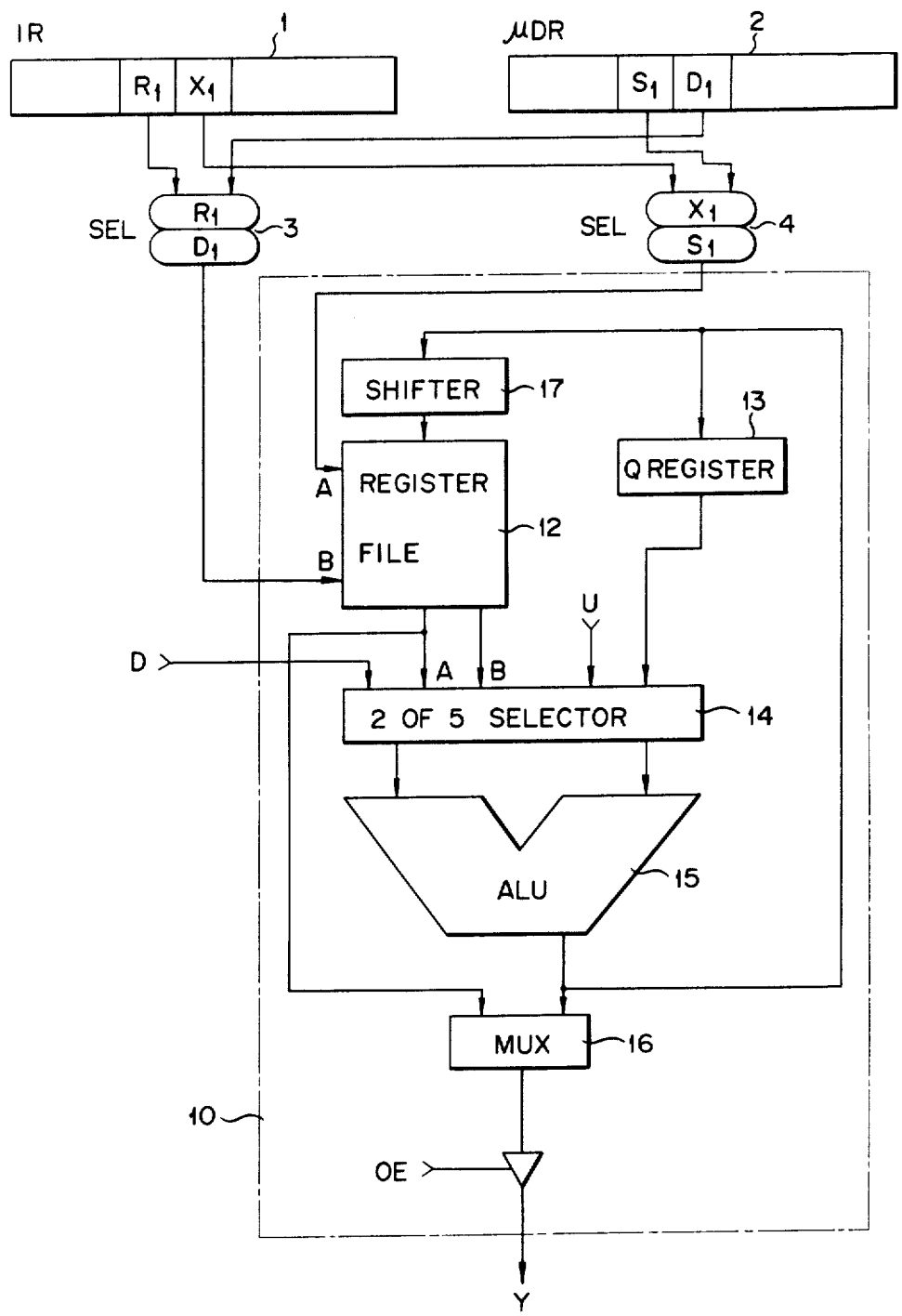
FIG. 1 is a block diagram of a prior art arithmetic operation control unit using microprocessors.
Figure 2:
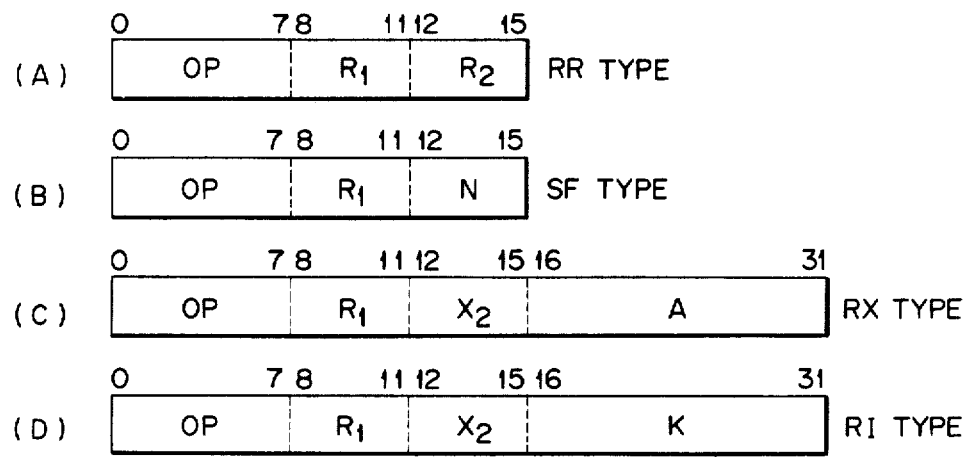
FIGS. 2A-2D show various types of formats which are used in a data processor according to the invention.
Figure 3:
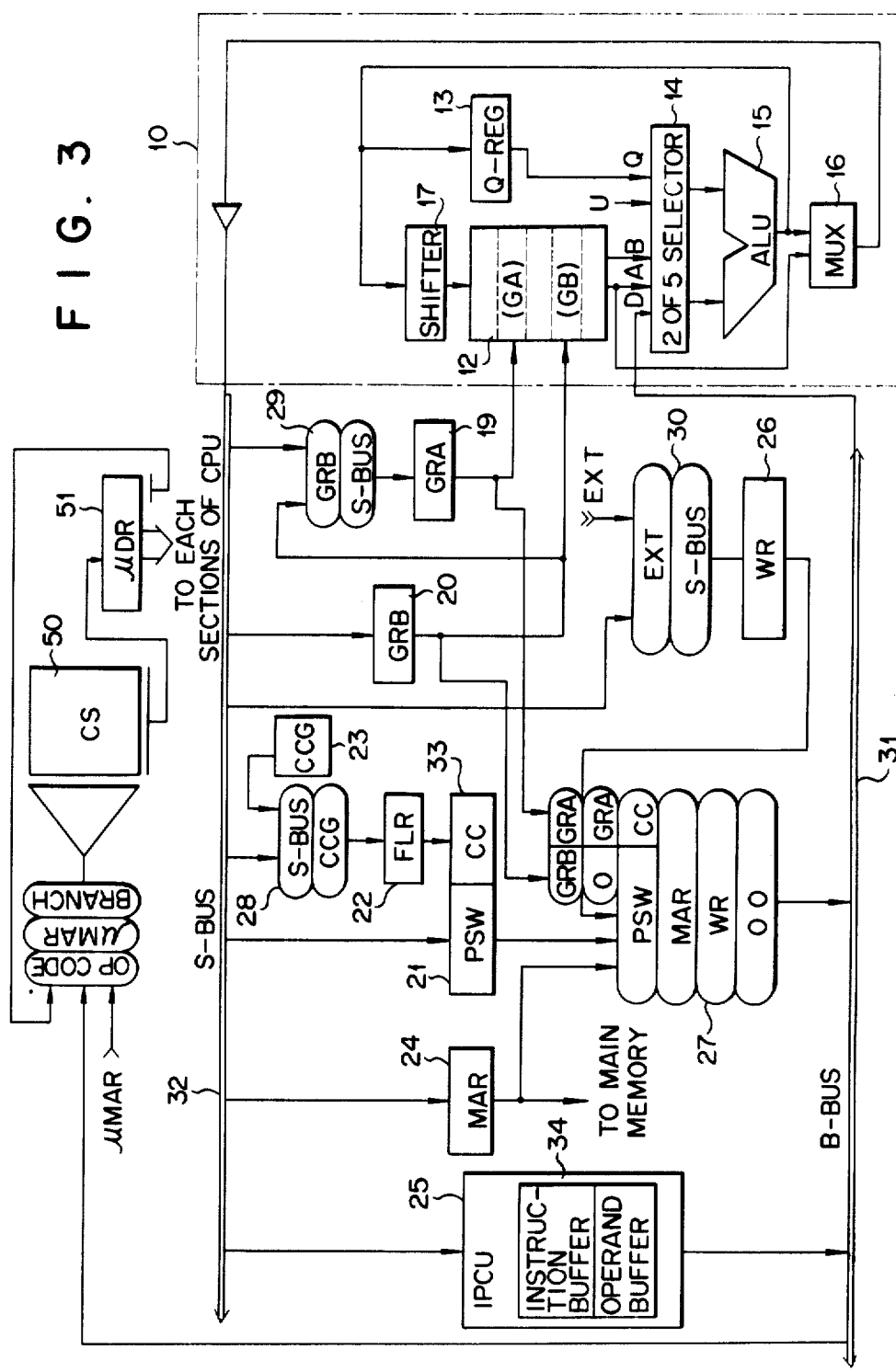
FIG. 3 is a block diagram of an embodiment of a data processor according to the invention.

FIG. 3 shows in block form an embodiment of a data processor according to the invention. FIG. 3 shows particularly a central processing unit (CPU) according to the invention. An arithmetic operation control unit 10, which comprises four microprocessors and can process 16-bit data, is the same as that of FIG. 1 and accordingly no further description will be given.

The data processor of the invention eliminates the use of the conventional instruction register but uses address registers GRA 19 and GRB 20 for directly driving a register file 12. In this embodiment, the register file 12 is a 2-port random access memory (RAM) but may be a single-port random access memory. The contents of the field which designate a general register in an instruction word are loaded into both the registers GRA 19 and GRB 20. The CPU further includes the following units to execute the instructions mentioned above. A program status word register PSW 21 stores the status of the program being executed and includes a condition code part (CC) which designates the status of a result of an operation upon execution of each operation. A value which changes during the course of the execution of an operation is set in a flag register 22 of which the output is the input to the condition code portion (CC) 33. A condition code generator CCG 23 generates the condition code. A memory address register (MAR) 24 stores a read or write address of a main memory (not shown).

An instruction prefetch control unit (IPCU) 25 includes an instruction buffer and an operand buffer. The IPCU 25 prefetches a user instruction from the main memory and stores the prefetched instruction in the instruction buffer while at the same time controlling a read operation from the instruction buffer and the operand buffer. The CPU includes further a working register (WR) 26, selectors 27 to 30, and 16 bit data busses B-bus 31 and S-bus 32 for transferring data between the operation control unit 10 and the remaining units.

The operation of the CPU will now be described. The CPU is operated under control of a microprogram as described below. The IPCU 25 prefetches an instruction from the main memory and loads the prefetched instruction into the instruction buffer. In a microstep preceding the first microstep of the microprogram for processing the user instruction word, a control storage device 50 is accessed with an operation code (referred to as an OP code) contained in the user instruction word. A microinstruction is then read out from the control memory device 50 in accordance with the OP code and stored in a microinstruction register (UDR) 51. Further, a decoded output signal from a decoder (not shown) controls the CPU shown in FIG. 3. When the microinstruction is read from the control storage device 50, the field of the user instruction word which specifies the general register is loaded into the register GRB 20. In the first microstep of the microprogram for executing an external user instruction word, the CPU is ready to execute the operation using the registers in file 12 in the microprocessor as general registers. Therefore, during most of an external instruction execution period, the instruction word may be executed without the instruction register storing the user instruction word. In the embodiment of FIG. 3, the control storage device 50 is addressed by using the OP code. The device may be addressed in other ways such as by using a microaddress register or a branch address of the microinstruction, the control storage circuit 50 being provided with an addressing device to allow addressing. For simplicity, only addressing using the OP code is described. Further, the embodiment of FIG. 3 uses all the registers of the register file 12 as general registers.

ADD INSTRUCTION (FIGS. 4 AND 5)

Figure 4:
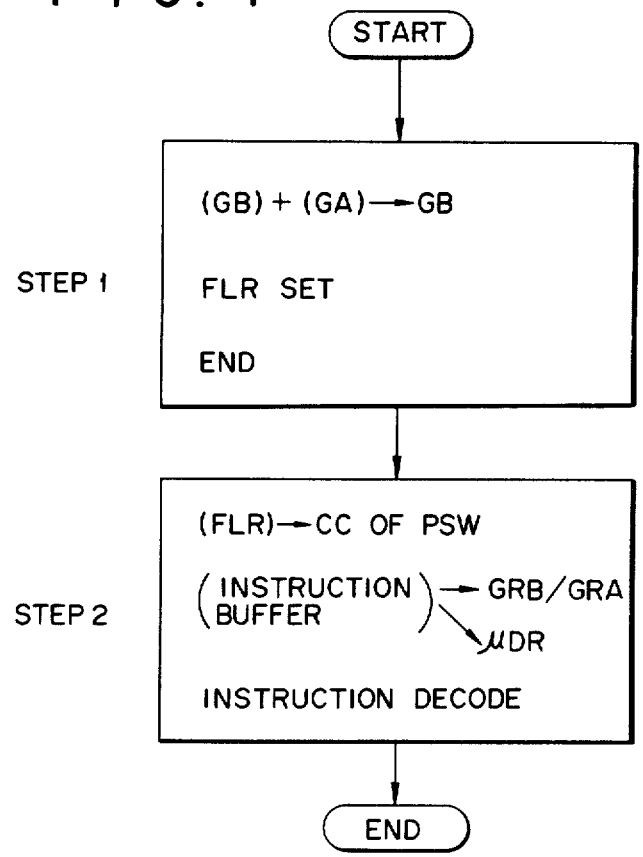
FIG. 4 is a flow chart illustrating execution of an ADD instruction in an RR type user instruction.
Figure 5:
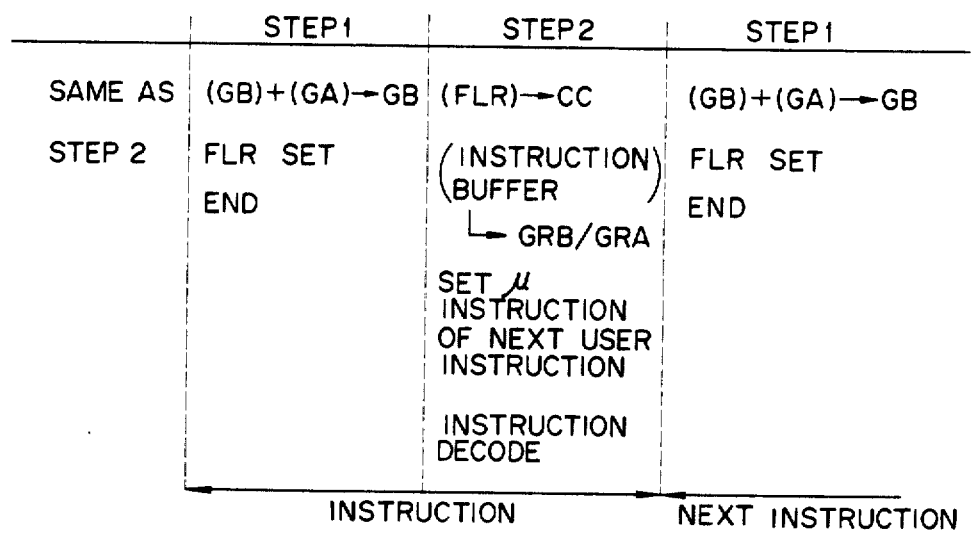
FIG. 5 is a timing chart of the ADD instruction executed according to FIG. 4.

FIGS. 4 and 5 are a microflow chart and a timing chart, respectively, which illustrates the carrying out of an ADD instruction according to the RR type user instruction shown in FIG. 2A which includes the OP code, an $R_1$ field, and an $R_2$ field. An ADD instruction is stored in the OP code. An address of a general register (GB) which stores the first operand and the operation result is set in the $R_1$ field. An address of a general register (GA) which stores the second operand is set in the $R_2$ field. The user instruction word is read out from the instruction buffer of the ICPU in the microstep immediately preceding the microstep which executes the instruction word under control of the instruction prefetch control unit (IPCU), as previously described. The OP code makes an access to the control storage device 50 to read out therefrom the microinstruction of the instruction word which is loaded into the microinstruction register UDR 51 and is decoded. The address values in the $R_1$ and $R_2$ fields are at the same time set in the register GRB 20 and the register GRA 19, through the B-bus 31, the selector 14, the ALU 15, the MUX 16 and the S-bus 32.

In an ADD instruction, the arithmetic operation terminates with the microsteps 1 and 2, as shown in FIGS. 4 and 5.

The operation of the data processor shown in FIG. 3 through the two microsteps will be described. In step 1, the contents (GB) of the general register GB specified by the register GRB 20 and the contents (GA) of the general register GA specified by the register GRA 19, are read out of the register file 12. The data read out is supplied through the selector 14 to the ALU 15 where the operation (GB)+(GA) is performed. The result of the operation is supplied through the shifter 17 to the general register GB specified by the register GRB 20. The status of the result of the operation is supplied to the flag register (FLR) 22, via multiplexer 16, the S-bus 32, and the selector 28. Here, the execution of step 1 terminates.

In step 2, the contents of the flag register FLR 22 are set in the condition code field (CC) 33 of a program status word register 21. In preparation for the execution of the next user instruction, the next user instruction is read out from the instruction buffer 34. If the next user instruction is of the RR type, the contents (the address data) of the $R_1$ field are set in the register GRB 20 the content (the address data) of the $R_2$ field are set in the register GRA 19. The microinstruction is read out from the control storage device 50 using the OP code and the microinstruction is decoded. At this point, the execution of step 2 terminates. Therefore, in processing the next instruction word, the execution of the arithmetic operation can be carried out immediately. In addition to an ADD instruction, the RR type user instruction may further include a SUBTRACT instruction, a MULTIPLY instruction, a DEVICE instruction, a COMPARE instruction, an AND instruction, an OR instruction, an EXCLUSIVE OR instruction and the like. Processing of those instructions, which involve different operations, follow the same procedure for processing an ADD instruction. Therefore, further description of those instructions will not be made.

MICROPROGRAM CONTROL (FIGS. 6 To 11)

The control of the microprogram in accordance with an RR type user instruction will now be described referring to FIGS. 6 and 7. A data processor which effects the microprogram control is illustrated in FIG. 6 and may comprise the same hardware as the data processor of FIG. 3. Accordingly, it will be described only briefly. An instruction register (IR)61 stores instructions and a register 62 stores a program status word (PSW). A working register (WR) 63 stores the result of an arithmetic operation or the like. The register file 64 constituting the general register is a RAM with a memory capacity of m+1 words having two ports, an A port and a B port. Registers GRA 65 and GRB 66 similar to those shown in FIG. 3 are provided so as to address the RAM 44 through the two ports so that both ports are used only to read out data two at a time from the register 64. In the write mode, data is written into the RAM 64 through port B. The data processor of FIG. 6 includes an OR gate 67, a Q register 68, selectors 69 and 70, an ALU 71, a source bus (S-bus) 72 and a destination bus (D-bus) 73. Four 4-bit slice microprocessors (AM2901A) may be used to form the general register file 64, the Q register 68, the selectors 69 and 70, and the ALU 71, as in the data processor of FIG. 3.

Turning now to FIG. 7, there is shown microprogram control section which controls the data processor shown in FIG. 6. The microprogram control section comprises a selector switch 75, a counter 76, a microaddress data register μADR 77, a control storage device 78 for storing the microprogram, a microinstruction register 79 for storing the microinstruction word, decoders 80 and 81, and an encoder 82. The microinstruction for a major operation such as addition, subtraction and the like, which is written into the microinstruction register 79, includes four fields: an operation code (OP) field, a destination designation (D) field designating a source destination register, designation (S) field designating a source register, and an extension designation (EXT) of an extended operation. Examples of D fields and S fields used in the present invention are tabulated in tables 1 and 2.

TABLE 1

| Code of D field | Contents of D field |
|---|---|
| 0 | REG A |
| 1 | REG B |
| . | . |
| . | . |
| . | REG N |
| . | |
| m−2 | GB |
| m−1 | GA |
| m | GR (GB) |
| . | |
| m+1 | . |
| . | |
| . | AR |

TABLE 2

| Code of S field | Contents of S field |
|---|---|
| 0 | REG A |
| 1 | REG B |
| . | . |
| . | . |
| n | REG N |
| n+1 | GB |
| n+2 | GA |
| n+3 | GR (GA) |
| n+4 | GR GR |
| . | . |
| . | . |

As seen from tables 1 and 2, the D and S fields of the microinstruction generally designate a specific register. A data processor having general registers (GR) therein uses an instruction to carry out an operation on the contents of the general registers GR and to load the result of the operation into the general registers GR. Such an instruction may be an RR user instruction (for example, GRi+GRj→Gri). In processing this sequence using a microprogram, if the designation of the source (operand) register, that is, the contents of the S field, fails to designate one register, the contents of one (GRi) of the registers GR must be stored in another working register, for example, the Q register 68 before the execution of the arithmetic operation. Thus, another microinstruction is required to store the contents of one of the registers GR in another working register, which lengthens the time required for the operation.

Therefore, the data processor according to the invention is so designed that, when the code of the S field is "n+4", the S field can designate a general register. According to the code "n+4" of the S field, the address register GRB 66 of the register file 64 which includes the general registers GR designates a general register GR to be read. The contents read from the general register GR are transferred as the first operand to the ALU 71. The address register GRA 65 designates a general register GR to be read and the contents read from the general register GR are transferred as the second operand to the ALU 71. Upon receipt of those contents of the general registers GR, the ALU 71 operates on the data thus received. The result of the operation is loaded into a general register GR designated by the address register GRB 66. To accomplish this microprogram control, the register file (RAM) 64 including the general registers GR must be capable of being accessed through two ports. That is why the register file is provided as a two port RAM.

Descriptions of the execution of an addition operation of data stored in the general registers of the data porcessor of FIGS. 6-7 will now be made with reference to FIG. 8. In step 1, when an RR type user instruction word is loaded into the instruction register IR 61 shown in FIG. 6, the OP code of the instruction word is supplied to the selector 75 shown in FIG. 7, via the D-bus 73. The OP code is selected by the selector 75 and is supplied as address data to the control storage device 78, through a decoder (not shown). The microinstruction corresponding to the OP code is then read out from the control storage device 78 and loaded into the microinstruction register 79. At this time, the code "n+4" in the S field of the microinstruction read out from the microinstruction register 79. The address means to sequentially read out microinstructions from the control storage device 78 is of a known type and may be an AM2909 (microprogram sequencer) manufactured by Advanced Micro Devices Inc. The microprogram sequencer is a 4-bit slice type address controller which sequentially accesses a series of microinstructions stored in a ROM. The microprogram sequencer can select an external direct input, an input from the R field of the instruction word, an input from a PUSH/POP stack, and an address from the program counter. The construction and operation of the AM2909 microprogram sequencer are described in "AM2900 Family Data Book with Related Support Circuit" (1978) published by Advanced Micro Devices Inc.

Under control of the microinstruction word, the operand $R_1$ of the RR instruction word is loaded into the address register GRB 66, via D-bus 73, selector 69, ALU 71 and S-bus 72. Similarly, the operand $R_2$ is loaded into the address register GRA 65.

In step 2, the code "n+4" of the S field of the microinstruction now stored in the microinstruction register 79 is supplied to a decoder 81. The decoder 81 decodes the code "n+4" and sets the decoded signal 43 to a logical "1". This state of signal 43 designates the data stored in the general registers of the register file 64 as source data. Under control of signal 43, the selector 70 (FIG. 6) selects the data read out from the general register of the register file 64 specified by the operand $R_1$ stored in the address register GRB 66, and supplies the selected data to one of the input terminals of the ALU 71. The encoder 82 encodes the output signal of decoder 81 into a signal 42 which is supplied to selector 69 to control it. Under control of signal 42, the selector 69 selects the data read out from the general register of the register file 64 specified by the operand $R_2$ stored in the address register GRA 65, and supplies the selected data to the other input terminal of the ALU 71. The ALU 71 executes the operation (addition in this embodiment) designated by the OP code in the OP field of the microinstruction word stored in the microinstruction register 79, on the data selected by the selectors 69 and 70 and transfers the result of the operation onto the S-bus 72.

The code in the D field of the microinstruction word stored in the microinstruction register 79 is decoded by the decoder 80 and then the decoder 80 supplies a write signal 41 to the destination register which stores the result of the operation. In this embodiment, the general register of the register file 64 serves as a destination register, so that a write signal 41 is supplied to the register file 64, through the OR gate 67. In response to the write signal 41, the register file 64 allows the result of the operation transferred through the S-bus 72 to be loaded into the address (general register) thereof specified by the operand $R_1$ stored in the address register GRB 66.

The signal 43 can be used as a write signal when logically ORed in the OR gate 67 with the write signal 41. Then, the field D may be omitted in the microinstruction word. To execute such a microinstruction, it is necessary to load addresses in the two address registers GRA 65 and GRB 66 for addressing the general registers of the RAM 64 using both ports before addresses are loaded into the registers GRA 65 and GRB 66 as described with respect to FIGS. 3 and 4.

Figure 8:
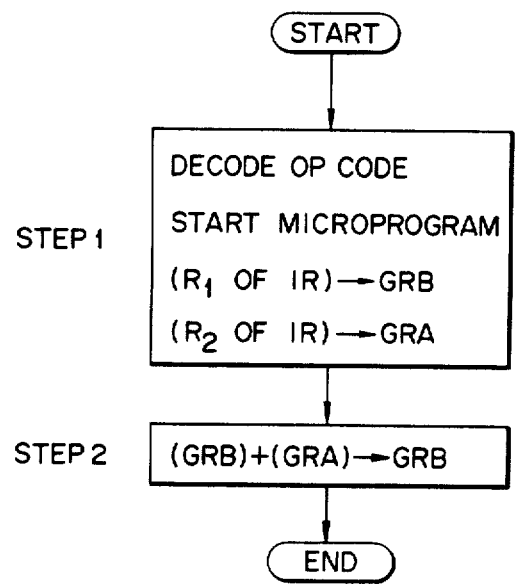
FIG. 8 is a flow chart illustrating operation of the data processor shown in FIG. 6.

The microsteps illustrated in FIG. 8 differ from those illustrated in FIG. 4. This arises from the difference between the data processors of FIGS. 3 and 6. Since the circuit in FIG. 3 is provided with an instruction prefetch control unit 25 execution of the next mircoinstruction which is performed in microstep 1 of FIG. 8 is performed in microstep 2 of, FIG. 4 in the same manner as in the microstep 1 of FIG. 8. In the description of FIG. 8 above, discussion of the flag information showing the result of the operation and the storing of the condition code were omitted.

Figure 9:
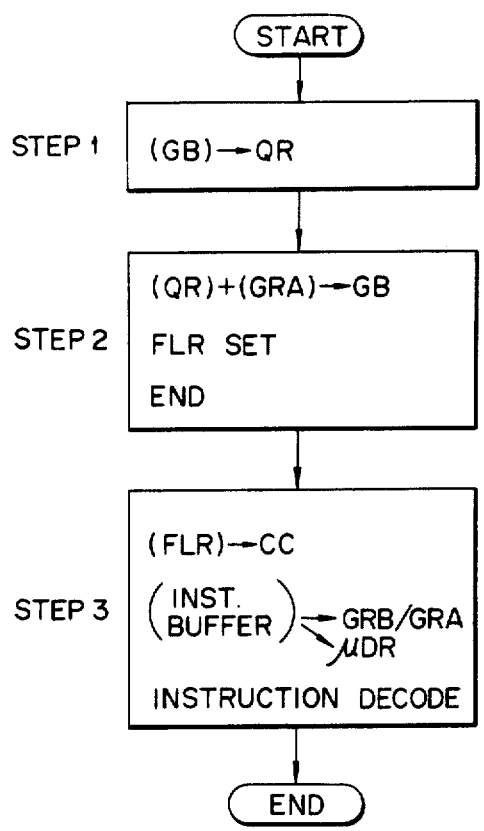
FIG. 9 shows a sequence of microsteps for executing SF, RX and RI type user instructions in a data processor according to the invention.

The execution of an SF type user instruction of FIG. 2B by the data processor of FIG. 3 will now be described using the microflow chart shown in FIG. 9. In the SF type user instruction word, the contents of the N field (FIG. 2B) (the second operand) are treated as numerical data. In the microstep immediately before the first microstep for executing the SF type user instruction word, the contents (the address value) of the $R_1$ field are set in the GRB 20 and the numerical value in the N field is set in the register GRA 19, as in the case of the RR type instruction. Thus, an arithmetic operation can be carried out at the start of execution of the instruction word. In step 1, the contents of the general register GB specified by the register GRB 20 are read out and loaded into the Q register 13, via the selector 14 and the ALU 15. In step 2, the numerical data in the register GRA 19 is inputted to one of the inputs of the ALU 15, via the selector 27, the B-bus 31 and the selector 14. At the same time, the output of the Q register 13 is supplied to the other input of the ALU 15 through the selector 14. In the ALU 15, the contents of the Q register 13 and of the register GRA 19 are operated upon, for example, to carry out the addition (QR)+(GRA). The result of the operation is stored in the general register GB specified by the register GRB 20 via the shifter 17. The setting of the flag register FLR 22 in step 1 and the prefetch operation of the next user instruction in step 3 are the same as those in processing an RR type instruction and accordingly, no further description will be made. In addition to an ADD instruction, the SF type user instruction may have other operation instructions for which the processing procedures are the same as that described above.

Figure 10:
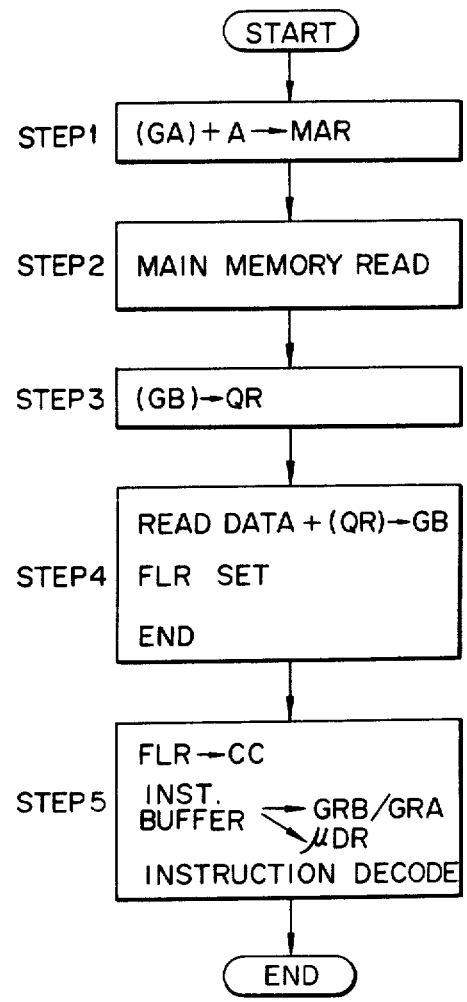
FIG. 10 shows a sequence of microsteps for executing RX type user instructions in a data processor according to the invention.

The processing of the RX type user instruction of FIG. 2C will now be described referring to FIG. 10. The $X_2$ field of the instruction represents a general register address, and its contents are used as an index to modify the index address. An A field representing a memory address and the $X_2$ field cooperate to form a second operand of the RX type instruction. The $R_1$ field of the first operand is the same as that described for the RR type instruction. In the microstep immediately before the first microstep for executing the RX type user instruction word, the address data of the $R_1$ field is loaded into the register GRB 20 and the address data in the $X_2$ field is set in the register GRA 19. Thus, an arithmetic operation can be carried out at the start of the execution of the RX type instruction word.

The operation of the data processor shown in FIG. 3 when an RX type user instruction is performed will be described referring to the microflow chart shown in FIG. 10. In step 1, the contents (GA) of the general register GA specified by the register GRA 19 are read out and inputted to one input of the ALU 15 by way of the selector 14. The contents (2 bytes) of the A field are read out from the instruction buffer of the instruction prefetch control unit IPCU 25 and inputted to the other input of the ALU 15 by way of the B-bus 31 and the selector 14. However, since the central processing unit employs a 16-bit architecture, the two bytes (16 bits) including the OP code, $R_1$ field, and the $X_2$ field of the instruction word are read out by the IPCU 25 before the instruction is executed, as described above and the 2 byte A field is read out from the instruction buffer during execution of step 1. In ALU 15, the addition operation (GA)+A is carried out and the operation result, i.e. an index modification, is stored in the memory address register MAR 24, through the multiplexer 16 and the S-bus 32. In step 2, the operand is read out from the main memory MM (not shown) by addressing thereof by the memory address register MAR 24. In the course of the read operation, a step 3 reads out the content (GB) of the general register GB specified by the register GRB 20 and supplies the read-out data to the Q register 13 via the selector 14 and the ALU 15. In a step 4, in a read operation, READ DATA is outputted from the operand buffer of the instruction prefetch control unit 25 and inputted to one of the inputs of the ALU 15, through the B-bus 31 and the selector 14. At the same time, the output of the Q register 13 is supplied to the other input of the ALU 15 by way of the selector 14. In the ALU 15, the addition operation READ DATA+(QR) is carried out and the result of the operation is stored in the general register GB specified by the register GRB 20 of the register file 12, through the shifter 17.

The setting of the flag register 22 in step 4 and the preparation for the execution of the next instruction are the same as those described for the RR type instruction and will not be described The RX type user instruction may include other operation instructions in addition to the ADD instruction. The procedure for carrying out such other instructions is the same as described above for the ADD instruction.

Figure 11:
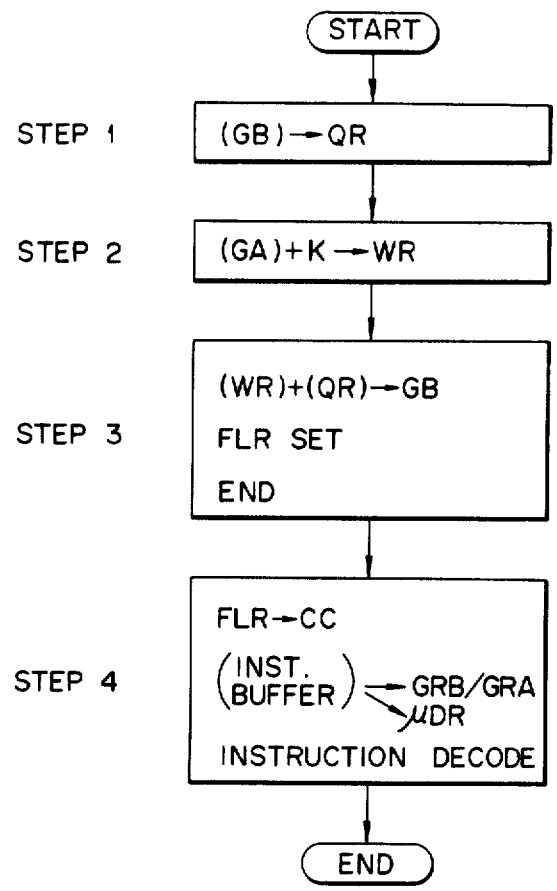
FIG. 11 shows a sequence of microsteps for executing RS type user instructions in a data processor according to the invention.

The execution of the RI type user instruction will now be described using the microflow chart shown in FIG. 11. The $R_1$ and $X_2$ fields of the user instruction word (FIG. 2D) are the same as those in the RX instruction. The K field of the RI instruction which contains numerical data and the $X_2$ field cooperate to form a second operand. In the microstep immediately before the first microstep for executing the user instruction, the address data of the $R_1$ field is set in the register GRB 20 and the data of the $X_2$ field is set in the register GRA 19, as in the case of the RR type instruction. Thus, an arithmetic operation can be carried out at the start of the execution of the RI instruction.

The operation of the data processor of FIG. 3 when an RS type instruction is executed will now be described with reference to the flow chart shown in FIG. 11. In step 1, the contents (GR) of the general register GB specified by the register GRB 20 are read out and loaded into the Q register B via the selector 14 and the ALU 15. In step 2, the contents (GA) of the general register GA specified by the register GRA 19 are read out and supplied through the selector 14 to one of the inputs of the ALU 15. The numerical data of the K field (2 bytes) in the RS instruction word is read out of the instruction buffer and is supplied to the other input of the ALU 15 through the B-bus 31 and the selector 14.

The read out operation of the K field is the same as that of the A field described for the RX type instruction word. The ADD operation (GA)+K is carried out in the ALU 15 and the result of the operation is stored in the working register WR 26 through the multiplexer 16, S-bus 32 and selector 30. In step 3, the contents (WR) of the working register WR 26 are inputted to the other input of the ALU 15, through the selector 27, the B-bus 31 and the selector 14. The output of the Q register 13 stored in step 1 is inputted to the other input of the ALU 15, through the selector 14. In the ALU 15, the addition operation (WR)+(QR), for example, is performed and the result of the operation is supplied through the shifter 17 to the general register GB specified by the register GRB 20 of the register file 12. The setting of the flag register 22 in step 3 and the preparation for the execution of the next instruction are the same as for the RR type instruction and will not be described here. The RS type user instruction may include other operation instructions in addition to an ADD instruction. The procedure for such other instructions is the same for the ADD instruction.

OTHER EMBODIMENTS OF DATA PROCESSORS (FIGS. 12, 13 AND 14)

Figure 12:
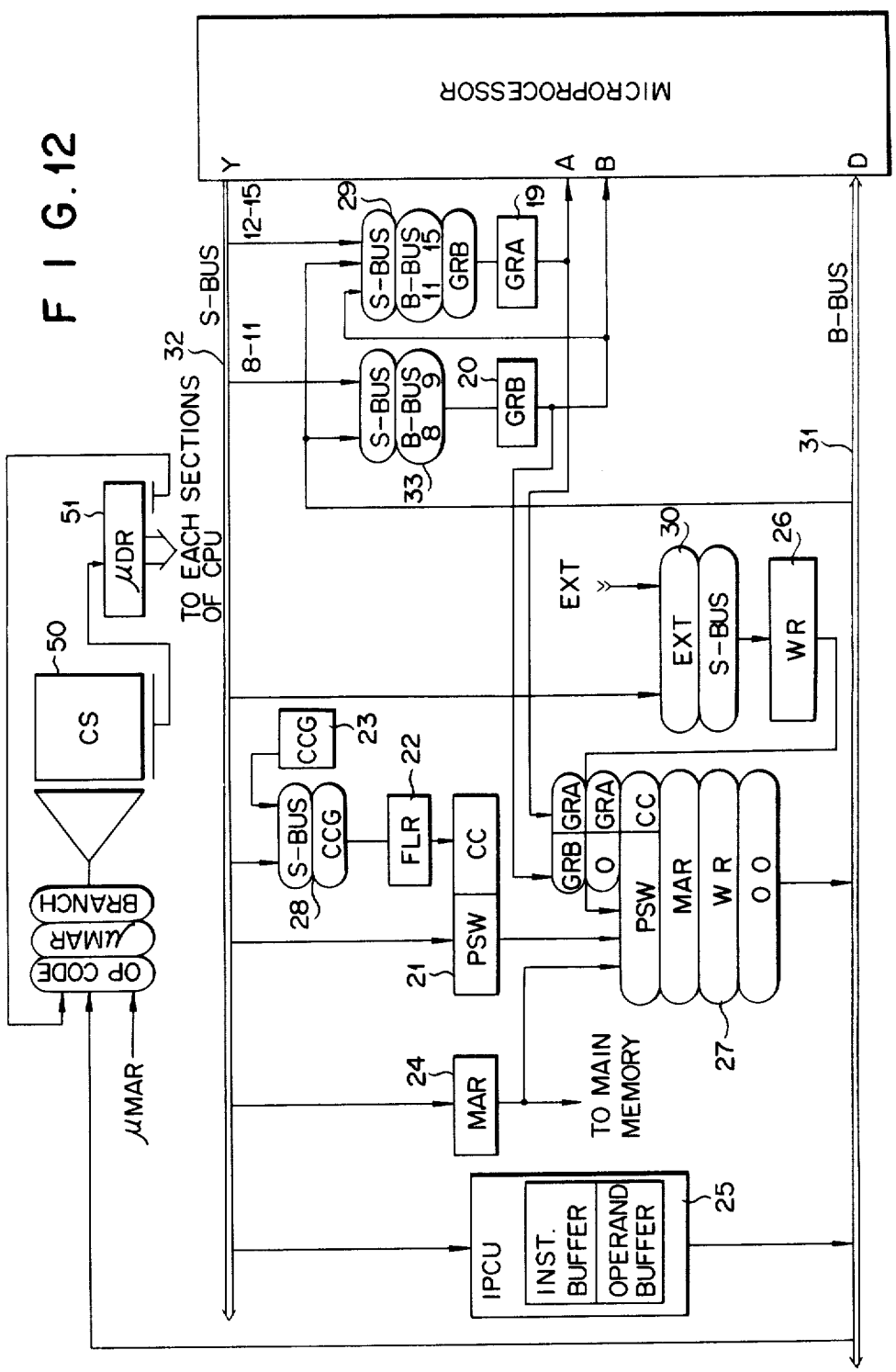
FIG. 12 is a block diagram of another embodiment of a data processor according to the invention.

Additional embodiments of data processors according to the invention will now be described with reference to FIGS. 12, 13 and 14. The embodiment shown in FIG. 12 employs hardware for setting the contents in the $R_1$ field of the instruction word in FIG. 2 into the register GRB 20 and the contents in the $R_2$ or $X_2$ field of the instruction word into the register GRA 19. As described above, the embodiment of FIG. 3 instead employs a microprogram. In the embodiment of FIG. 12, the contents of the $R_1$, $R_2$ and $X_2$ fields are transferred through the operation control unit 10 comprised of the microprocessors. The data ($R_1$) ranging from bit 8 to bit 11 on the B-bus is transferred through the selector 33 to the register GRB 20. The data ($R_2$ or $X_2$) ranging from bit 12 to bit 15 on the B-bus 31 is transferred through the selector 29 to the register GRA 19. The strobing of the registers GRA 19 and GRB 20 and the switching between the selectors 29 and 30 are carried out by the IPCU 25. Specifically, the instruction word is read out from the instruction buffer within the IPCU 25 onto the B-bus 31 while at the same time the selectors 29 and 33 are switched. Further, the register GRB 20 is strobed. The remaining construction of the data processor of FIG. 12 is the same as that of FIG. 3 and accordingly will be described.

In the embodiment shown in FIG. 13, a part of the register file 12 may be used as a working register and may be accessed by the microinstruction in the working register. To be more specific, when the number of the registers of the register file 12 contained in the microprocessor is larger than that usable as general registers, the remaining registers are used as working registers. In such a case, when the working register is addressed by the microinstruction properly, the microprogramming operation is enhanced. To this end, a field to address a part or all of the register file 12 is included in the microinstruction read out from the control storage device 50 and is supplied to the microinstruction register 51 and at the same time to the registers GRB 20 and GRA 19. Thus immediately before execution of the instruction, the operation control unit 10 is put in the same state as in step 1 in FIG. 4, for example. As a result, the register file 12 is addresssed in accordance with the designation of the microinstruction register from the standpoint of the microprogram.

Figure 14:
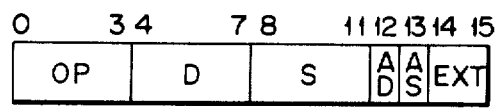
FIG. 14 illustrates a microinstruction format used in the embodiment shown in FIG. 13.

FIG. 14 shows a format of a microinstruction used in the embodiment shown in FIG. 13. As shown, the microinstruction word of 16-bit length includes an instruction code field OP, a destination designation field D, a source designation field S, address designation fields AD and AS, and an instruction code extension field EXT. The contents of the destination designation field D and the contents of the source designation field S are controlled by the bit information of the corresponding address designation fields AD and AS in the following manner. When the address designation field AD is a logical "0", the destination designation field D specifies the register for storing the result of the operation of the microinstruction. When it is a logical "1", the contents of the field D are set in the register GRB 20 as address data for the register file 12 in order to load the result of the operation instructed by the microinstruction into the working register WR of the register file 12 in the microprocessor. When the address designation field AS is a logical "0", the source designation field S specifies the register which is used for the execution of the microinstruction. When it is a logical "1", the contents of the source designation field S are set in the register GRA 19 as address data for the register file 12 in order to read out the contents from the working register WR of the register file 12 for execution of the microinstruction within the microprocessor. Accordingly, when the bit information of the address designation fields AD and AS is a logical "1", the working register WR of the register file 12 may be addressed by the microinstruction.

As described above, the data processor of the invention can directly drive the register file of the microprocessor by the output of the register, thus shortening instruction execution time. In the step immediately before the first step for executing the instruction word, a part of the instruction word is set in the register and thereby the first step of the microprogram accesses the general register of the register file to substantially execute the instruction. This speeds up the data processing of the data processor.

When the number of registers in the register file in the microprocessor is larger than that of the registers specified by the instruction word, the remaining registers are used as working registers which are freely addressed by a microinstruction. This enhances microprogramming. The invention eliminates the instruction register. This reduces the hardware required and reduces the cost of the device. If registers GRA/GRB are provided which can count address data, an instruction which successively accesses a plurality of general registers, such a LOAD/STORE instruction and MULTIPLY instruction, may be used. This feature simplifies system design.

What we claim is:

1. A data processor controlled by a microprogram for executing a user instruction comprising:

a semiconductor logic circuit including register file means having a plurality of addressable locations for storing information, at least one of which is for storing an operand, the semiconductor logic circuit further including an arithmetic logic circuit and selector means provided between the register file means and the arithmetic logic circuit for selectively transferring information from the register file means to the arithmetic logic circuit, the arithmetic logic circuit, the selector means and the register file means being part of the same chip, the register file means having an input through which the addressable locations can be addressed and the chip having a terminal coupled to said input;

register means connected directly to the chip terminal to which the input of the register file means of the semiconductor logic circuit is coupled for storing an address of one of the addressable locations of the register file means;

means for writing into the register means an address from the user instruction of an addressable location of the register file means for storing an operand;

means under control of the microprogram for reading an operand stored in the register file means using the address written in the register means, and for transferring the operand read from the register file means to the arithmetic logic circuit through the selector means, the arithmetic logic circuit executing an operation of the user instruction while the microprogram is being executed.

2. A data processor according to claim 1, wherein the register file means includes two addressable locations for storing operands and has two inputs through which addressable locations can be addressed, the chip having two terminals each coupled to a different one of said inputs, and wherein the register means includes two registers each for storing an address of the two addressable locations of the register file means, and wherein the means for writing writes into each of the two registers of the register means an address from the user instruction which is the address of a different one of the two addressable locations of the register file means, and wherein the means for reading simultaneously reads the two addressable locations of the register file means using the addresses written in the two registers of the register means and transfers operands stored in the two addressable locations to the arithmetic logic circuit through the selector means, the arithmetic logic circuit executing an operation of the user instruction while the microprogram is being executed.

3. A data processor according to claim 1 or 2, wherein the register file means is constituted by a random access memory having a memory location corresponding to each addressable location and a port corresponding to each input of the register file means.

4. A data processor according to claim 3, wherein the random access memory is a two-port random access memory.

5. A data processor according to claim 1 and including means for transferring the address of the addressable location of the register file means for storing the operand and from the user instruction to the register means through the semiconductor logic circuit.

6. A data processor controlled by a microprogram for executing a user instruction comprising:

(A) a control storage having a plurality of memory locations for storing microprograms each consisting of microinstructions;

(B) addressing means for supplying addresses to said control storage thereby to specify respective memory locations, one of the addresses being a start address designated by the user instruction;

(C) a microinstruction register for storing a microinstruction read from one of the memory locations of the control storage according to an address supplied by the addressing means;

(D) a semiconductor logic circuit including register file means having a plurality of addressable locations for storing information, at least one of which is for storing an operand, the semiconductor logic circuit further including an arithmetic logic circuit and selector means provided between the register file means and the arithmetic logic circuit for selectively transferring information from the register file means to the arithmetic logic circuit, the arithmetic logic circuit, the selector means and the register file means being part of the same chip, the register file means having an input through which the addressable locations can be addressed and the chip having a terminal coupled to said input;

(E) register means connected directly to the chip terminal to which the input of the register file means of the semiconductor logic circuit is coupled for storing an address of one of the addressable locations of the register file means;

(F) means for writing into the register means an address from the user instruction of an addressable location of the register file means for storing an operand;

(G) means for reading microinstructions from the control storage according to the address supplied by said addressing means and supplying the microinstructions to the microinstruction register;

(H) means for reading an operand stored in the register file means at the same time that a microinstruction is read out using the address written in the register means; and (I) means for transferring the operand read from the register file means to the arithmetic logic circuit through the selector means, the arithmetic logic circuit executing an operation of the user instruction while the microinstruction is being executed.

7. A data processor according to claim 6, wherein a start address designated by a next user instruction is transferred to the addressing means in parallel with execution of a final microinstruction of the microprogram for controlling the execution of the user instruction and the transfer of the address of the register file means designated by next user instruction to the register means.

8. A data process controlled by a microprogram for executing a user instruction comprising:
(A) a control storage having a plurality of memory locations for storing microprograms each consisting of microinstructions;
(B) addressing means for supplying addresses to said control storage thereby to specify respective memory locations, one of the addresses being a start address designated by the user instruction;
(C) a microinstruction register for storing a microinstruction read from one of the memory locations of the control storage according to an address supplied by the addressing means;
(D) a semiconductor logic circuit including a register file constituted by a 2-port random access memory having a plurality of memory locations at least two of which are for storing operands, an arithmetic logic circuit, and selector means provided between the register file and the arithmetic logic circuit for selectively transferring information from the register file to the arithmetic logic circuit, the arithmetic logic circuit, the selector means and the register file being part of the same chip, the chip having two terminals each coupled to a different port of the random access memory;
(E) first register means connected directly to one of the two chip terminals to which one of the ports of the random access memory is coupled and second register means connected directly to the other of the two chip terminals to which the other port of the random access memory is coupled for respectively storing two addresses of the register file corresponding to two memory locations of the random access memory which are designated in an operand field of the user instruction;
(F) means for writing into each register means from the user instruction a different address of the register file corresponding to memory locations of the random access memory for storing operands;
(G) means for reading microinstructions from the control storage according to the address supplied by the addressing means and supplying the microinstructions to the microinstruction register;
(H) means for reading the operands stored in the register file at the same time that a microinstruction is read out using the two addresses in the first and second register means; and
(I) control means for transferring the two operands read from the register file to the arithmetic logic circuit through the selector means, the arithmetic logic circuit executing an operation of the user instruction while the microinstruction is being executed, the control means further writing the result of the operation into the memory location of the random access memory whose address is specified by one of the two addresses in the first and second register means.

9. A data processor according to claim 8, wherein the control means includes a decoder connected to the microinstruction register for decoding a source field of the microinstruction and an encoder connected to the decoder, the source field containing information which identifies as source data operands stored in the memory locations of the random access memory which are designated by the addresses in the first and second register means, the decoder and encoder being coupled to the selector means, the decoder controlling selection of one of the operands to be transferred to the arithmetic logic unit and the encoder controlling selection of the other operand to be transferred to the arithmetic logic unit.

10. A data processor controlled by a microprogram for executing a user instruction comprising:
(A) a control storage having a plurality of memory locations for storing microprograms each consisting of microinstructions;
(B) addressing means for supplying addresses to said control storage thereby to specify respective memory locations, one of the addresses being a start address designated by the user instruction;
(C) a microinstruction register for storing a microinstruction read from one of the memory locations of the control storage according to an address supplied by the addressing means;
(D) a semiconductor logic circuit including a register file constituted by a random access memory having a plurality of addressable memory locations for storing information, an arithmetic logic circuit, and a first selector means provided between the register file and the arithmetic logic circuit for selectively transferring information from the register file to the arithmetic logic circuit, the arithmetic logic circuit, the register file and the first selector means being part of the same chip, some of the memory locations being usable as general registers and others as working registers;
(E) register means connected directly to the semiconductor logic circuit for specifying addresses of said register file;
(F) second selector means connected to receive an address recorded in an operand field of the user instruction and data in a specified field of a microinstruction, said second selector means supplying the address and the data to the register means one at a time;
(G) means for reading data from the general registers of the register file and transferring it to the arithmetic logic circuit according to a microinstruction for executing a user instruction using the address transferred from the second selector means to the register means;
(H) means for transferring data from the second selector means to the working registers of the register file while a microinstruction is being executed; and
(I) means for reading data from the working registers of the register file and transferring it to the arithmetic logic circuit when a microinstruction for accessing the working registers is read from the control storage to the microinstruction register.

11. A data processor according to claim 10, wherein the data in said specified field is supplied from the control storage directly to the second selector means.

* * * * *

UNITED STATES PATENT AND TRADEMARK OFFICE
CERTIFICATE OF CORRECTION

PATENT NO. : 4,347,566

DATED : August 31, 1982

INVENTOR(S) : Akira Koda, et al

It is certified that error appears in the above—identified patent and that said Letters Patent is hereby corrected as shown below:

Col. 2, line 2, change "and" to --or--.

Col. 2, line 20, correct spelling of "execution".

Col. 2, line 20, correct spelling of "instructs".

Col. 3, line 1, correct spelling of "execution".

Col. 4, line 3, after "instruct" delete "the".

Col. 5, line 29, change "an" to --the--.

Col. 6, line 24, after "GRB 20" insert --and--.

Col. 6, line 67, after "shown" insert --a--.

Col. 7, line 11, after "register," insert --a source--.

Col. 8, line 23, correct spelling of "Description".

Col. 7, line 11, delete "source" and insert --destination--.

Col. 8, line 25, correct spelling of "processor".

Col. 9, line 38, after "25" insert -- , --.

Col. 9, line 40, after "of," delete -- , --.

Col. 10, line 66, after "described" insert -- , --.

Col. 12, line 10, after "will" insert --not--.

UNITED STATES PATENT AND TRADEMARK OFFICE
CERTIFICATE OF CORRECTION

PATENT NO. : 4,347,566

DATED : August 31, 1982

INVENTOR(S) : Akira Koda, et al

It is certified that error appears in the above—identified patent and that said Letters Patent is hereby corrected as shown below:

Col. 12, line 25, after "Thus" insert -- , --.

Col. 12, line 60, change "field" to --file--.

Col. 13, line 13, after "such" insert --as--.

In the Claims:

Col. 16, line 1, change " . " to -- , --.

Col. 16, line 60, change " ." to -- , --.

Signed and Sealed this

Tenth Day of May 1983

[SEAL]

Attest:

GERALD J. MOSSINGHOFF

Attesting Officer — Commissioner of Patents and Trademarks